United States Patent Office 3,644,365
Patented Feb. 22, 1972

3,644,365
CERTAIN BIS(α-AMINOPROPYL)HYDROURACILS
Juergen Habermeier, Allschwil, Daniel Porret, Binningen, and Wolfgang Seiz, Basel, Switzerland, assignors to Ciba Limited, Basel, Switzerland
No Drawing. Filed Dec. 1, 1969, Ser. No. 881,267
Claims priority, application Switzerland, Dec. 3, 1968, 18,012/68; Jan. 10, 1969, 310/69
Int. Cl. C07d 51/34
U.S. Cl. 260—256.4 C  4 Claims

ABSTRACT OF THE DISCLOSURE

New di-N,N'-γ-aminopropyl-dihydrouracils, for example 1,3-di-(γ-aminopropyl)-5,5-dimethyl-5,6-dihydrouracil, and their use as curing agents in curable moulding, coating and adhesive compositions which contain a polyepoxide compound, for example a liquid polyglycidyl ether of bisphenol A. Curing can be carried out at relatively low temperatures, for example at 40° C. The new type of curing agent bridges, in respect of its gradation of reactivity, a gap between aliphatic polyamines and cycloaliphatic polyamines. The new curing agents furthermore have the advantage relative to the aromatic polyamines of being non-toxic.

---

It is known that epoxide resins can be cured by monobasic or polybasic aliphatic, cycloaliphatic or aromatic amines. Curing with aliphatic amines, such as diethylenetriamine, triethylenetetramine or hexamethylenediamine leads, even in the cold or at room temperature, to products having good mechanical properties which however do not always suffice for the highest requirements. The aliphatic polyamines are furthermore not physiologically harmless. The cycloaliphatic polyamines, such as diaminodicyclohexylmethane, are as a rule less toxic than the aliphatic polyamines but on the other hand cure more slowly, and at only moderately elevated cure temperatures (for example 40° C.) it is in general not possible to achieve optimum properties of castings or coatings. Curable mixtures of epoxide resins and aromatic polyamines, such as phenylenediamine or 4,4'-diaminodiphenylmethane, can as a rule only be cured at higher temperatures to give industrially usable products. Furthermore the aromatic amines are more or less strongly toxic.

Thus the following sequence of reactivity applies to the main classes of amine curing agents known as curing agents for epoxide resins: aliphatic amines>cycloaliphatic amines>aromatic amines.

For practical requirements, a gap hitherto existed in the reactivity gradation between the aliphatic amines and the cycloaliphatic amines. It has now been found that by the use of certain di-primary diamines containing a heterocyclic nucleus and in particular of di-γ-aminopropyldihydrouracils, which have hitherto not been described in the literature, it is possible to bridge this previous gap.

At only moderately elevated curing temperatures of 30 to 60° C. these di-(γ-aminopropyl)-dihydrouracils under comparable conditions yield mouldings of improved mechanical properties, above all of better impact strength and elongation at break, than the aliphatic and cycloaliphatic polyamines which are known as curing agents.

The physiologically harmless new di-(γ-aminopropyl)-dihydrouracils are furthermore, for many applications, a fully equivalent replacement for the toxic aromatic amines hitherto usual as curing agents for these purposes.

Admittedly some types of amine curing agents for epoxide resins have already been proposed in the literature, in which one or more aminoalkyl groups are located on a heterocyclic nucleus. Thus British patent specification 869,484 describes mono-aminoalkylpiperazines, such as aminoethylpiperazine, as curing agents for epoxide resins. This class of curing agents yields mouldings having good mechanical properties only at higher curing temperatures. By contrast, brittle, industrially unusable castings are obtained at curing temperatures of about 40° C.

French patent specification 1,399,171 and Austrian patent specification 250,024 further describe 3,4,5,6-tetrahydropyrimidine derivatives, which carry one or two γ-aminopropyl groups in the 3-position, as curing agents for epoxide resins. Under comparable curing conditions, these tetrahydropyrimidine derivatives however yield mouldings having lower impact strengths than the mouldings manufactured with the aid of the present γ-aminopropyl-dihydrouracils.

The subject of the present invention is thus new di-primary diamines containing the dihydrouracil ring, of formula

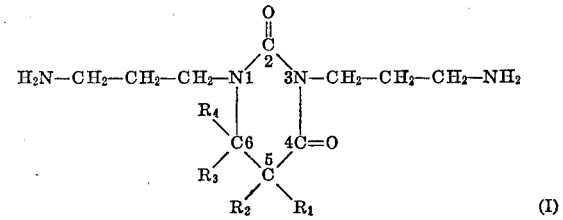

(I)

wherein $R_1$ and $R_3$ independently of each other denote a hydrogen atom or an aliphatic, cycloaliphatic, araliphatic or aromatic hydrocarbon residue, such as especially a lower alkyl residue with 1 to 4 carbon atoms, and $R_2$ and $R_4$ each represent an alkyl residue, especially a lower alkyl residue with 1 to 4 carbon atoms, or a hydrogen atom.

Preferably, the residues $R_1$, $R_2$ and $R_3$ in the above-mentioned Formula I either denote hydrogen atoms or $C_1$–$C_4$-alkyls and the residue $R_4$ a hydrogen atom.

The new diamines of Formula I can, according to the invention, be manufactured by hydrogenating a di-(β-cyanethyl)-uracil of formula

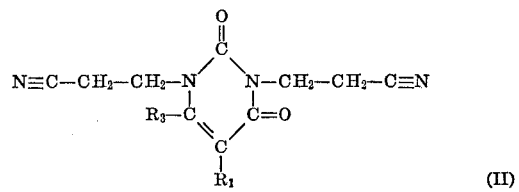

(II)

or a di-(β-cyanethyl)-dihydrouracil of formula

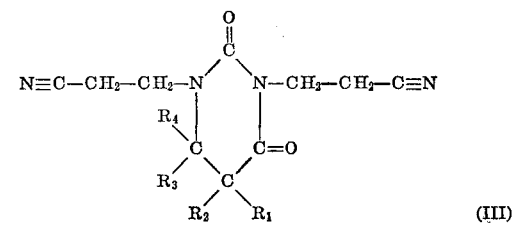

(III)

wherein the symbols $R_1$, $R_2$, $R_3$ and $R_4$ have the same significance as in the above-mentioned Formula I, in a manner which is in itself known. The hydrogenation is preferably carried out in the presence of ammonia and a hydrogenation catalyst, such as Raney nickel or Raney cobalt.

The di-(β-cyanethyl)-uracils of Formula II or di-(β-cyanethyl)-dihydrouracils of Formula III used as starting substances in the process according to the invention are technically conveniently accessible through the addition of acrylonitrile ("cyanethylation"), in the presence of a catalyst such as for example NaOH or KOH, to a uracil of formula

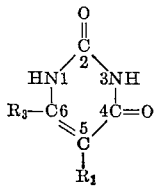

or a dihydrouracil of formula

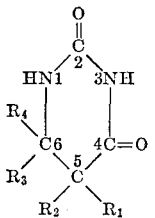

wherein $R_1$, $R_2$, $R_3$ and $R_4$ have the same significance as in Formula I.

As uracils of Formula IV there may for example be mentioned: uracil itself and also 6-methyl-uracil and thymin (=5-methyl-uracil).

As dihydrouracils of Formula V there may for example be mentioned: 5,6-dihydrouracil, 6-methyl-5,6-dihydrouracil, 6-phenyl - 5,6 - dihydrouracil, 5,5-dimethyl-5,6-dihydrouracil (=2,4-dioxo-5,5-dimethylhexahydropyrimidine) and 5,5-dimethyl-6-isopropyl - 5,6 - dihydrouracil (=2,4 - dioxo - 5,5 - dimethyl - 6 - isopropyl - hexahydropyrimidine).

The catalytic hydrogenation of the di-($\beta$-cyanethyl)-uracils of Formula II or of the di-($\beta$-cyanethyl)-dihydrouracils of Formula III is appropriately carried out in the presence of a hydrogenation catalyst and of ammonia. The presence of ammonia largely suppresses the production of undesired by-products such as secondary amines, condensed products and the like. Ammonia can for example be employed in a gaseous or liquid form or in the form of a solution in methanol, dioxan and other solvents. Raney nickel or Raney cobalt are particularly effective as hydrogenation catalysts. It is also possible to use a cobalt oxide catalyst on a suitable support material and reduce this to cobalt metal catalyst in a stream of hydrogen. The catalytic reduction is as a rule carried out by mixing the di-($\beta$-cyanethyl)-uracil or -dihydrouracil with the ammonia and catalyst and passing hydrogen gas into the reaction mixture. The hydrogenation can in principle be carried out at atmospheric pressure and room temperature; however elevated pressures of 20 atmospheres and above, and elevated reaction temperatures in the range of 50–150° C. are preferred. The hydrogenation is continued until no further hydrogen is absorbed.

When using di-($\beta$-cyanethyl)-uracils as the starting substances, the C=C double bond in the uracil nucleus is hydrogenated simultaneously with the nitrile groups.

After completion of the hydrogenation the catalyst is separated off, for example by filtration, and the ammonia and solvent are distilled off.

As mentioned initially, the new diamines of Formula I represent valuable curing agents for epoxide resins.

The subject of the present invention is therefore also curable mixtures which are suitable for the manufacture of mouldings, impregnations, coatings and adhesive bonds and which are characterised in that they contain (a) a polyepoxide compound with an average of more than one epoxide group in the molecule and (b) as the curing agent, a di-primary diamine containing the dihydrouracil ring, of Formula I.

Appropriately, 0.5 to 1.3 equivalents, preferably about 1.0 equivalent, of nitrogen-bonded active hydrogen atoms of the di-($\gamma$-aminopropyl)-dihydrouracil of Formula I are used per 1 equivalent of epoxide groups of the polyepoxide compound (a).

Possible polyepoxide compounds (a) are above all those with an average of more than one glycidyl group, $\beta$-methylglycidyl group or 2,3-epoxycyclopentyl group bonded to a hetero-atom (for example sulphur, preferably oxygen or nitrogen); the following may be mentioned especially: bis-(2,3-epoxycyclopentyl)ether, diglycidyl ethers or polyglycidyl ethers of polyhydric aliphatic alcohols, such as 1,4-butanediol, or polyalkylene glycols, such as polypropylene glycols; diglycidyl ethers or polyglycidyl ethers of cycloaliphatic polyols, such as 2,2-bis-(4-hydroxycyclohexyl) propane; diglycidyl ethers or polyglycidyl ethers of polyhydric phenols, such as resorcinol, bis-(p-hydroxyphenyl) methane, 2,2-bis(p-hydroxyphenyl)propane (=diomethane), 2,2-bis(4'-hydroxy - 3',5' - dibromophenyl)propane, 1,1,2,2-tetrakis-(p-hydroxyphenyl)ethane, or of condensation products of phenols with formaldehyde obtained under acid conditions, such as phenol novolacs and cresol novolacs; di- and poly-($\beta$-methylglycidyl)ethers of the above-mentioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N' - tetraglycidyl-bis(p-aminophenyl)-methane; triglycidyl-isocyanurate; N,N'-diglycidylethyleneurea; N,N'-diglycidyl-5,5-dimethyl-hydantoin, N,N'-diglycidyl-5-isopropyl-hydantoin; N,N' - diglycidyl-5,5-dimethyl-6-isopropyl - 5,6 - dihydrouracil or 1,3 - di($\beta$-glycidyloxy-n-propyl)-5,5-dimethylhydantoin.

If desired, active diluents such as for example styrene oxide, butyl glycidyl ether, isooctyl glycidyl ether, phenylglycidyl ether, cresyl glycidyl ether or glycidyl esters of synthetic highly branched mainly tertiary aliphatic monocarboxylic acids ("Cardura E") can be added to the polyepoxides in order to lower the viscosity.

The curing of the curable mixtures according to the invention to give mouldings and the like is appropriately carried out in the temperature range of 20 to 120° C., preferably at 30 to 60° C. The curing can, in a known manner, also be carried out in two or more stages, with the first curing stage being carried out at a lower temperature (for example about 40° C.) and the post-curing at a higher temperature (for example 100° C.).

The curing can, if desired, also be carried out in two stages by first prematurely stopping the curing reaction or carrying out the first stage at room temperature or at only slightly elevated temperature, whereupon a curable precondensate which is still fusible and soluble (a so-called "B-stage") is obtained from the epoxide component (a) and the amine curing agent (b). Such a precondensate can for example serve for the manufacture of "prepregs," compression moulding compositions or especially sintering powders.

In order to shorten the gelling times or cure times, known accelerators for curing with amines, for example monophenols or polyphenols, such as phenol or diomethane, salicylic acid, tertiary amines or salts of thiocyanic acid, such as $NH_4SCN$, can be added.

The term "curing" as used here denotes the conversion of the soluble, either liquid or fusible, polyepoxides into solid, insoluble and infusible, three-dimensionally crosslinked products or materials, and in particular as a rule with simultaneous shaping to give mouldings, such as castings, pressings, laminates and the like or "two-dimensional structures" such as coatings, lacquer films or adhesive bonds.

The curable mixtures according to the invention from polyepoxide compounds (a) and di-($\gamma$-aminopropyl)-dihydrouracils of Formula I as curing agents (b) can furthermore be mixed, in any stage before curing, with the usual modifiers such as extenders, fillers and reinforcing agents, pigments, dyestuffs, organic solvents, plasticizers, flow control agents, agents for conferring thixotropy, flameproofing substances or mould release agents.

As extenders, reinforcing agents, fillers and pigments which can be employed in the curable mixtures according to the invention there may for example be mentioned: coal tar, bitumen, textile fibres, glass fibres, asbestos fibres, boron fibres, carbon fibres, cellulose, polyethylene powder, polypropylene powder; quartz powder; mineral silicates such as mica, asbestos powder or slate powder; kaolin, aluminium oxide trihydrate, chalk powder, gypsum, antimony trioxide, bentones, silica aerogel ("Aerosil"), lithopone, barytes, titanium dioxide, carbon black, graphite, oxide colours such as iron oxide, or metal powders, such as aluminium powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols can be employed as plasticisers for modifying the curable mixtures.

Silicones, cellulose acetobutyrate, polyvinyl butyral, waxes, stearates and the like (which in part are also employed as mould release agents) can be added as flow control agents when employing the curable mixtures, especially in surface protection.

Especially for use in the lacquer field, the polyepoxide compounds can furthermore be partially esterified in a known manner with carboxylic acids, such as, especially, higher unsaturated fatty acids. It is furthermore possible to add other curable synthetic resins, for example phenoplasts or aminoplasts to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the special end use, in the unfilled or filled stage, optionally in the form of solutions or emulsions, as paints, lacquers, as sintering powders, compression moulding compositions, injection moulding formulations, dipping resins, casting resins, impregnating resins, binders and adhesives, as tool resins, laminating resins, sealing and filling compositions, floor covering compositions and binders for mineral aggregates.

In the examples which follow, unless otherwise stated, parts denote parts by weight and percentages denote percentages by weight. Parts by volume and parts by weight bear the relation of the millilitre to the gram.

The following epoxide resin was used for the manufacture of curable mixtures described in the examples:

Epoxide Resin A

Polyglycidyl ether resin (industrial product) manufactured by condensation of diomethane (2,2-bis(p-hydroxyphenyl)-propane) with a stoichiometric excess of epichlorhydrin in the presence of alkali consisting mainly of diomethane-diglycidyl ether of formula

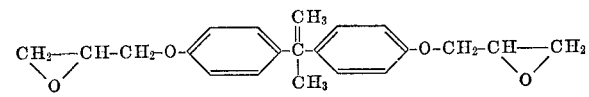

which is liquid at room temperature and has the following characteristics:

Epoxide content: 5.1–5.5 epoxide equivalents/kg.
Viscosity (Hoeppler) at 25° C.: 9000–13,000 cp.

Epoxide Resin B

Liquid to crystalline diomethane-diglycidyl ether (industrial product):

Epoxide content: 5.70 epoxide equivalents/kg.
Viscosity (Hoeppler) at 25° C.: ~5000 cp.

Epoxide Resin C

Industrial 1,3-diglycidyl-5,5-dimethylhydantoin (crystal sludge):

Epoxide content: 8.0 epoxide equivalents/kg.

Epoxide Resin D

Industrial 1,3-di-(β-glycidyloxy-n-propyl)-5,5-dimethylhydantoin:

Epoxide content: 5.73 epoxide equivalents/kg.
Viscosity (Hoeppler) at 20° C.: ~650 cp.

For determination of the mechanical and electrical properties of the curable mixtures described in the examples which follow, sheets of 135 x 135 x 4 mm. were manufactured for determining the flexural strength, deflection, impact strength and water absorption. The test specimens (60 x 10 x 4 mm.) for determining the water absorption and for the flexing test and impact test (VSM 77,103 and 77,105 respectively) were machined from the sheets.

Test specimens of dimensions 120 x 15 x 10 mm. were in each case cast for determining the heat distortion point according to Martens (DIN 53,458).

Sheets of dimensions 120 x 120 x 4 mm. were cast for testing the arcing resistance and the tracking resistance (VDE 0303).

MANUFACTURING EXAMPLES.—EXAMPLE 1

(a) Manufacture of 1,3-di-(β-cyanethyl)-5,5-dimethyl-5,6-dihydrouracil

A suspension of 35.5 g. of 5,5-dimethyl-5,6-dihydrouracil (=2,4-dioxo - 5,5 - dimethyl-hexahydropyrimidine) [0.25 mol] in 32.0 g. of acrylonitrile (0.6 mol) is heated to 65° C. whilst stirring and 1 ml. of 50% strength aqueous sodium hydroxide solution is then added. An exothermic reaction immediately occurs and the reaction mixture warmed to 86° C. After 25 minutes a colourless, clear and homogeneous melt is obtained. The mixture is stirred for a further 2 hours at 90° C. and cooled to room temperature. The viscous melt is triturated with 3 ml. of methanol and a colourless crystal sludge is produced. Yield: 62.2 g. (100% of theory), melting point: 84–87° C.

The crude product can be recrystallised from water/ethanol (9:1). A pure product is obtained which melts at 88.5 to 89.5° C. Elementary analysis shows 22.51% N (calculated, 22.57% N). The infrared spectrum shows, inter alia through the absence of N—H-amide frequencies and through the presence of a very sharp C≡N absorption at 4.42μ, that 1,3-di-(β-cyanethyl)-5,5-dimethyl-5,6-dihydrouracil has been produced. The H—NMR (nuclear magnetic resonance) spectrum shows the presence of 16 protons, which agrees with theory.

(b) Manufacture of 1,3-di-(γ-aminopropyl)-5,5-dimethyl-5,6-dihydrouracil

A mixture of 27.0 g. of 1,3-di-(β-cyanethyl)-5,5,-dimethyl-5,6-dihydrouracil (manufactured according to Example (1a) [0.1088 mol], 5.0 g. of Raney nickel and 1 litre of dioxan is hydrogenated for 5.5 hours in a stirred autoclave at 120° C. under 50 atmospheres hydrogen pressure. 8 g. of ammonia gas is still passed into the mixture before the hydrogenation. After the reaction the nickel is filtered off and the dioxan is distilled off until constant weight is reached (70° C./12 mm. Hg). 27.9 g. (100% of theory) of a pale green liquid with 6.16 amine equivalents/kg. (78.8% of theory) are obtained. The crude product can be purified by distillation; it boils at 162–164° C. under 0.35 mm. Hg. The purified product is a colourless oil with 7.41 amine group equivalents/kg. (corresponding to 94.8% of theory); the viscosity (Hoeppler) at 20° C. is 1380 cp. Elementary analysis shows 22.06% N (calculated, 21.86% N). The infrared spectrum shows, inter alia through NH$_2$-absorptions at 2.95 and 3.00μ, that the desired substance, 1,3-di-(γ-aminopropyl)-5,6-dimethyl-5,6-dihydrouracil, has been produced:

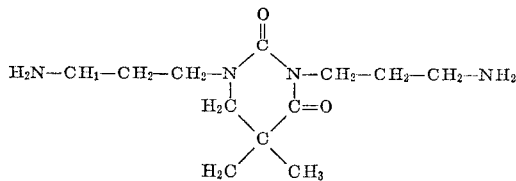

EXAMPLE 2

Manufacture of 1,3-di-(γ-aminopropyl)-5,5-dimethyl-5,6-dihydrouracil

A mixture of 496.6 g. of 1,3-di-(β-cyanethyl)-5,5-dimethyl-5,6-dihydrouracil (manufactured according to Example 1(a)) [2 mols], 2150 ml. of dioxan, 100 g. of Raney nickel and 200 g. of ammonia gas is hydrogenated in 2 hours at 100° C. under 120 atmosphere hydrogen pressure. The mixture is worked up as described in Example 1(b) and 462.5 g. (corresponding to 90.2% of theory) of crude 1,3-di-(γ-aminopropyl)-5,5-dimethyl-5,6-dihydrouracil are obtained. This product has an amine group content of 7.49 equivalents per kg. (96% of theory). This, like the elementary analysis given below, shows that the crude product manufactured in this way is of high purity.

Calculated (percent): C, 56.22; H, 9.44; N, 21.86.
Found (percent): C, 56.0; H, 9.4; N, 21.4.

EXAMPLE 3

(a) Manufacture of 1,3-di-(β-cyanethyl)-6-methyluracil

A suspension of 63.2 g. of 6-methyluracil (0.5 mol), 400 ml. of dimethylformamide and 1.26 g. of finely powdered potassium hydroxide is heated to 100° C. with good stirring. 58.4 g. of acrylonitrile (1.1 mols) are added dropwise to this suspension over the course of 1 hour. Hereupon a clear light yellow solution is produced; this is stirred for a further 2 hours at 110° C. The solution is cooled to room temperature, mixed with 400 ml. of water and cooled to 0° C.; snow-white crystals precipitate. These are filtered under good suction, rinsed with 50 ml. of ice-cold acetone and dried at 80° C. in air. 100.4 g. of crude 1,3-di-(β - cyanethyl) - 6 - methyluracil (86.5% of theory) are obtained.

The product can be purified by recrystallisation from acetone. The crystalline product thus obtained melts at 162–164° C.; the infrared spectrum shows the identity of the substance, inter alia, by the nitrile absorption at 4.44μ.

(b) Manufacture of 1,3-di-(γ-aminopropyl)-6-methyl-5,6-dihydrouracil

A mixture of 56.0 g. of 1,3-di-(β-cyanethyl)-6-methyluracil (manufactured according to Example 3(a)) [0.241 mol], 600 ml. of ethanol, 10 g. of Raney nickel and 15 g. of ammonia gas is hydrogenated for 1.5 hours at 160° C. under 120 atmospheres hydrogen pressure in a stirred autoclave. After the reaction the nickel is removed by filtration; the alcohol is distilled off at 60° C./12 mm. Hg and subsequently at 80° C./0.05 mm. Hg until constant weight is reached. 56.7 g. (98.1% of theory) of a moss-green substance with an amine group content of 5.52 equivalents/kg. (67% of theory) are obtained. The product can be distilled under 0.1 mm. Hg at 180–182° C. A colourless liquid is obtained which on cooling solidifies to give white crystals. The amine content of the purified product is 7.09 equivalents/kg. (85.3% of theory). Elementary analysis shows 22.2% N (calculated, 23.3% N). The infrared spectrum shows, inter alia through NH₂ bands at 3.00 and 3.07μ, that 1,3-di-(γ-aminopropyl)-6-methyl-5,6-dihydrouracil has essentially been produced. This is also confirmed by the H—NMR (nuclear magnetic resonance) spectrum which also shows, inter alia, that the C=C double bond in the heterocyclic nucleus also undergoes hydrogenation. The resulting diamine accordingly has the formula

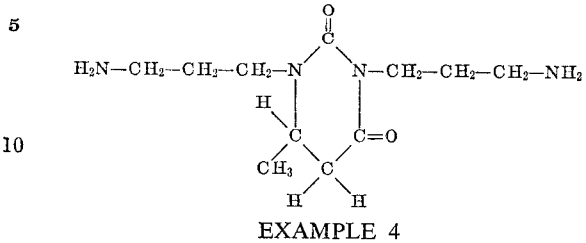

EXAMPLE 4

(a) Manufacture of 1,3-di-(β-cyanethyl)-5,5-dimethyl-6-isopropyl-5,6-dihydrouracil A suspension of 828.0 g. of 5,5-dimethyl-6-isopropyl-5,6 - dihydrouracil (=2,4-dioxo-5,5-dimethyl-6-isopropylhexahydropyrimidine) [4.5 mols] and 850 ml. of dimethylformamide is stirred at 70° C. 2 ml. of 40% strength benzyltrimethylammonium hydroxide solution (in methanol) are added and 491.0 g. of acrylonitrile (9.25 mols) are added dropwise over the course of 35 minutes. The heating bath is removed, the reaction is exothermic and the temperature of the reaction mixture is 77–85° C. A clear pale yellow solution is obtained which is stirred for a further 30 minutes at 75° C. Thereafter the solution is cooled to room temperature, filtered, and concentrated on a rotary evaporator in a waterpump vacuum at 60° C. Thereafter the residue is dried for 5 hours under a vacuum of 0.1 mm. Hg at 80° C. 1291.8 g. of a pale yellow resin (98.9% of theory) are obtained. The crude dinitrile thus obtained is purified by dissolving the crude product in boiling 50% strength ethanol. The solution is allowed to cool slowly with good stirring. The crystal mass is removed from the mother liquor by filtration and is rinsed with a little absolute ethanol and then with ether. The colourless crystalline substance is dried at 25° C. over P₂O₅ under 0.2 mm. Hg. 904 g. of purified 1,3-di-(β-cyanethyl) - 5,5 - dimethyl-6-isopropyl-5,6-dihydrouracil (69.2% of theory) are obtained. The substance melts at 72–74° C.

Elementary analysis shows
Calculated (percent): C, 62.04; H, 7.64; N, 19.30.
Found (percent): C, 62.13; H, 7.56; N, 19.21.

The infrared spectrum (trituration with liquid paraffin) shows, through the absence of N—H frequencies and through the presence of a relatively intense absorption at 2260 cm.⁻¹ originating from the nitrile groups, that the desired substance has been produced.

The proton-magnetic resonance spectrum (60 Mc H—NMR, recorded in CHCl, with tetramethylsilane as the internal standard) shows, through the presence of the signals for the following 22 protons:

6 protons at δ=0.75
0.86
1.01    Quartet:
1.12

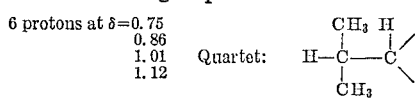

6 protons at δ=1.28
1.38    Doublet:

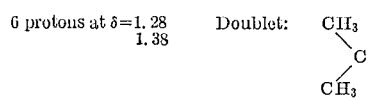

10 protons between δ=2.5–4.5, in multiplets corresponding to:

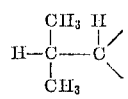

and

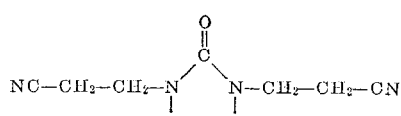

that the desired substance, 1,3-di-(β-cyanethyl)-5,5-dimethyl-6-isopropyl-5,6-dihydrouracil has been produced:

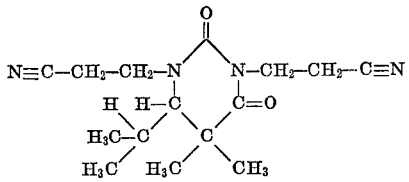

(b) Manufacture of 1,3-di-(γ-aminopropyl)-5,5-dimethyl-6-isopropyl-5,6-dihydrouracil A solution of 580.6 g. of 1,3-di-(β-cyanethyl)-5,5-dimethyl-6-isopropyl-5,6-dihydrouracil [manufactured according to Example 4(a)] (2 mols) in 2.5 litres of dioxan is introduced into a stirred autoclave together with 100 g. of Raney nickel. The mixture is saturated with ammonia gas at room temperature. The hydrogenation is carried out under 125 atmospheres hydrogen pressure and at a temperature of 100–107° C. for 15 hours. After the hydrogenation the nickel catalyst is filtered off and the solution is concentrated at 60° C./12 mm. Hg. Thereafter the product is dried at 80° C./0.1 mm. Hg for a further 2 hours. A colourless to pale yellow oil containing 5.40 amine group equivalents/kg. (corresponding to 78.5% of theory) is obtained.

The infrared spectrum shows, through the absence of the nitrile bands at 2260 cm.$^{-1}$ and through the presence of absorption in the region of 3250–3600 cm.$^{-1}$, that an amine is present. The proton magnetic resonance spectrum also shows that the resulting substance essentially has the following structure:

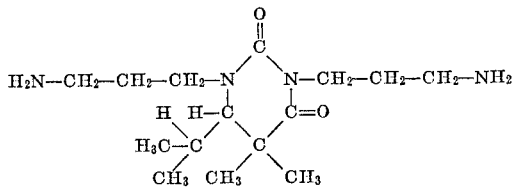

USE EXAMPLES.—EXAMPLE I 76.9 parts of epoxide resin A (liquid diomethane-diglycidyl ether having an epoxide content of 5.25 equivalents/kg. and a viscosity of about 9500 cp. at 25° C.) are homogeneously mixed at 40° C. with 27.0 parts of 1,3 - di-(γ-aminopropyl) - 5,5-dimethyl-5,6-dihydrouracil (manufactured according to Manufacturing Example 2). The resulting mixture (sample A) is poured into an aluminium mould (13.5 × 4.1 × 1.2 cm., wall thickness 0.15 mm.) prewarmed to 40° C. Curing takes place in 24 hours at 40° C.

Table 1 shows the properties of the practically colourless, clear and transparent casting:

TABLE 1

Sample A:

| | |
|---|---|
| G. of amine curing agent per 100 g. of epoxide resin A | 35.1 |
| Flexural strength (VSM 77,103) kg./mm.$^2$ | 13.18 |
| Deflection (VSM 77,103) mm. | 11.4 |
| Heat distortion point according to Martens (DIN 53,458) ° C. | 80 |
| Water absorption (4 days: 20° C.) percent | 20 |

Comparison experiment

For comparison, samples B, C, D and E were prepared by in each case mixing 100 g. of the liquid epoxide resin A used in Example I (liquid diomethane-diglycidyl ether having an epoxide content of 5.25 equivalents/kg.) with the equivalent amounts, indicated in Table 2, of triethylenetetramine (sample B) 1,6 - hexamethylenediamine (sample C), bis - (4-amino-4-methylcyclohexyl)-methane (sample D) and 1-(2'-aminoethyl)-piperazine (sample E) at 40° C. The mixtures are cured for 25 hours at 40° C. analogously to sample A according to Example I, and the properties of the castings are determined. The results are summarised in Table 2.

| | Sample B | Sample C | Sample D | Sample E |
|---|---|---|---|---|
| | Triethylene-tetra-mine | Hexa-methyl-ene-diamine | Bis-(4-amino-3-methyl-cyclo-hexyl)-methane | 1-(2'-amino-ethyl)-piper-azine |
| Grams of amine curing agent per 100 grams of epoxide resin A | 10 | 15 | 33 | 23 |
| Flexural strength VSM (kg./mm.$^2$) | 10.9 | 12.0 | | |
| Deflection VSM (mm.) | 4.4 | 10.5 | Brittle, cannot be machined | |
| Impact strength VSM (cm. kg./cm.$^2$) | 6.9 | 8.8 | | |
| Heat distortion point according to Martens DIN (° C.) | 60 | 67 | | |
| Water absorption (4 days: 20° C.)(percent) | 0.21 | 0.29 | | |

These results show that test specimens, cured at 40° C., from sample A according to the invention possess significantly better mechanical properties than the test specimens from samples B, C, D and E according to the state of the art, obtained under analogous conditions. The greatest improvements relate to the impact strength, which it was possible to double approximately, and to the considerably higher Martens value.

EXAMPLE II

A curable mixture according to Example I of 76.9 parts of epoxide resin A and 27.0 parts of 1,3-di-(γ-aminopropyl) - 5,5-dimethyl-5,6-dihydrouracil (sample $A_1$) is poured into aluminium moulds analogously to Example I and subjected to the following curing cycle: 24 hours at 40° C.+6 hours at 100° C.

For comparison, a known curable mixture is manufactured from 100 g. of epoxide resin A and 29 g. of 2-methyl - 3,3-bis-(γ-aminopropyl)-3,4,5,6-tetrahydropyrimidine (sample R). This comparison mixture is cured analogously to sample $A_1$ according to the invention for 24 hours at 40° C. and then for 6 hours at 100° C.

Table 3 shows the properties of castings from sample $A_1$ according to the invention and from the known sample F.

TABLE 3

| | Sample $A_1$ | Sample F |
|---|---|---|
| Grams of amine curing agent per 100 grams of epoxide resin A | 35.1 | 29 |
| Flexural strength VSM (kg./mm.$^2$) | 13.9 | 12.0 |
| Deflection VSM (mm.) | 11.7 | 10.0 |
| Impact strength VSM (cm. kg./cm.$^2$) | 19.8 | 14.0 |
| Water absorption 4 days, 20° C. (percent) | 0.34 | 0.35 |

The experiment shows that test specimens from sample $A_1$ according to the invention possess a higher flexural strength, but above all a higher impact strength, than the test specimens from the known sample F obtained under analogous conditions.

EXAMPLE III

A mixture of 87.7 parts of epoxide resin B (liquid to crystalline diomethane-diglycidyl ether with 5.70 epoxide equivalents/kg. and a viscosity of about 5000 cp. at 25° C.) and 30.0 parts of 1,3-di-(γ-aminopropyl)-5,5-dimethyl-5,6-dihydrouracil (manufactured according to Manufacturing Example 2) is well stirred at 40° C., then poured into aluminium moulds as described in Example I and cured in 24 hours at 40° C. The practically colourless castings have the following mechanical properties:

Flexural strength (VSM 77,103)—13.62 kg./mm.²
Deflection (VSM 77,103)—15.5 mm.
Impact strength (VSM 77,105)—25.0 cm. kg./cm.²
Heat distortion point according to Martens (DIN 54,458)—93° C.
Water absorption (4 days, 20° C.)—0.35%

EXAMPLE IV

The mixture described in Example III is cured as follows: 24 hours at 40° C. + 6 hours at 100° C.

The practically colourless, clear and transparent mouldings thus obtained have the following properties:

Flexural strength (VSM 77,103)—13.99 kg./mm.²
Deflection (VSM 77,103)—13.8 mm.
Impact strength (VSM 77,105)—19.2 cm. kg./cm.²
Heat distortion point according to Martens (DIN 54,548)—100° C.
Water absorption (4 days, 20° C.)—0.34%

EXAMPLE V 65.8 parts of epoxide resin C (industrially manufactured 1,3-diglycidyl-5,5-dimethyl-hydantoin having an epoxide content of 8.0 equivalents/kg.) are fused and then cooled to room temperature. 34.5 parts of 1,3-di-(γ-aminopropyl)-5,5-dimethyl-5,6-dihydrouracil (manufactured according to Example 2) are added to this clear viscous substance. This mixture is stirred at about 30° C. to give a homogeneous, clear and transparent mass and is cast into an aluminium mould (13.5 x 4.1 x 1.2 cm., wall thickness about 0.15 mm.). The filled mould is left for 2 hours in a waterbath at 15° C. (balancing the very intense exothermic effect); finally it is cured in 24 hours at 40° C. and 4 hours at 100° C. A colourless, glass-clear moulding having the following properties is obtained:

Flexural strength (VSM 77,103)—9.2 kp./mm.²
Deflection (VSM 77,103)— 2.8 mm.
Heat distortion point according to Martens (DIN 53,458)—79° C.

EXAMPLE VI 100 parts of epoxide resin B (liquid to crystalline diomethane-diglycidyl ether with 5.70 epoxide equivalents/kg.) are mixed at 35° C. with 53.0 g. of 1,3-di-(γ-aminopropyl-5,5-dimethyl-6-isopropyl-5,6-dihydrouracil [manufactured according to Example 4(b)]. The homogeneous mixture is poured into aluminium moulds (13.5 x 4.1 x 1.2 cm., wall thickness about 0.15 mm., for mechanical values; 13.5 x 13.5 x 0.4 cm., wall thickness 4.0 mm., for electrical values) and is cured for 24 hours at 40° C. + 6 hours at 100° C. Colourless, clear and transparent mouldings with the following properties are obtained:

Flexural strength (VSM 77,103)—14.65 kp./mm.²
Deflection (VSM 77,103)—10.9 mm.
Impact strength (VSM 77,105)—8.8 cm. kg./cm.²
Heat distortion point according to Martens (DIN 53,458)—90 C.
Dielectric constant, $\epsilon_r$ at 70° C.—4.15
Dielectric loss factor, tg. δ (50 Hz) at 70° C.—0.3.10⁻²
Specific resistance at 20° C.—4.5.10¹⁶Ω x cm.
Water absorption (4 days, 20° C.)—0.83%

EXAMPLE VII

A mixture of 160 parts of epoxide resin D (industrially manufactured 1,3 - di-(β-glycidyloxy-n-propyl) - 5,5 - dimethylhydantoin having an epoxide content of 5.73 epoxide equivalents/kg.) and 61.4 parts of 1,3-di-(γ-aminopropyl) - 5,5-dimethyl-5,6-dihydrouracil (manufactured according to Example 2) is stirred at 25° C. to give a homogeneous, clear mixture, poured into aluminium moulds prewarmed to 40° C. (13.5 x 13.5 x 0.4 cm. and 13.5 x 13.5 x 0.2 cm., wall thickness in each case 0.4 cm.) and cured in 24 hours at 40° C. + 6 hours at 100° C. Clear, transparent mouldings with the following properties are obtained:

Flexural strength (VSM 77,103)—7.04 kp./mm.²
Deflection (VSM 77,103)—8.1 mm.
Impact strength (VSM 77,105)—31.71 cm. kg./cm.²
Tensile strength (VSM 77,101)—4.90 kg./mm.²
Elongation at break (VSM 77,101)—11.1%
Dielectric constant $\epsilon_r$—4.10
Specific resistance (20° C.)—9.1°¹⁵Ω x cm.

We claim:
1. A di-primary diamine of formula

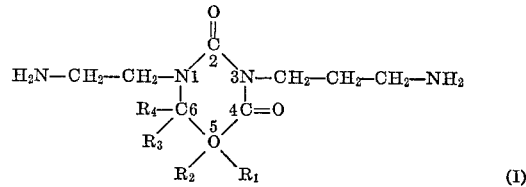

(I)

wherein $R_1$, $R_2$, $R_3$ and $R_4$ each represents a member selected from the group consisting of hydrogen atom, alkyl with 1 to 4 carbon atoms, alkenyl with 1 to 4 carbon atoms, cyclohexyl, cyclohexenyl and phenyl.

2. 1,3 - di-(γ-aminopropyl)-5,5-dimethyl-5,6-dihydrouracil.

3. 1,3-di-(γ-aminopropyl)-6-methyl-5,6-dihydrouracil.

4. 1,3 - di - (γ-aminopropyl)-5,5-dimethyl-6-isopropyl-5,6-dihydrouracil.

References Cited
UNITED STATES PATENTS 2,842,547   7/1958   Chit et al. _____ 260—256.4 C ALEX MAZEL, Primary Examiner R. J. GALLAGHER, Assistant Examiner U.S. Cl. X.R.

260—2 EP, 47 EP, 59, 260

CASE 6607/1+2/E

PO-1050
(5/69)

UNITED STATES PATENT OFFICE
CERTIFICATE OF CORRECTION

Patent No. 3,644,365            Dated February 22, 1972

Inventor(s) JUERGEN HABERMEIER ET AL

It is certified that error appears in the above-identified patent and that said Letters Patent are hereby corrected as shown below:

Claim 1, column 12, please amend the structural formula to read:

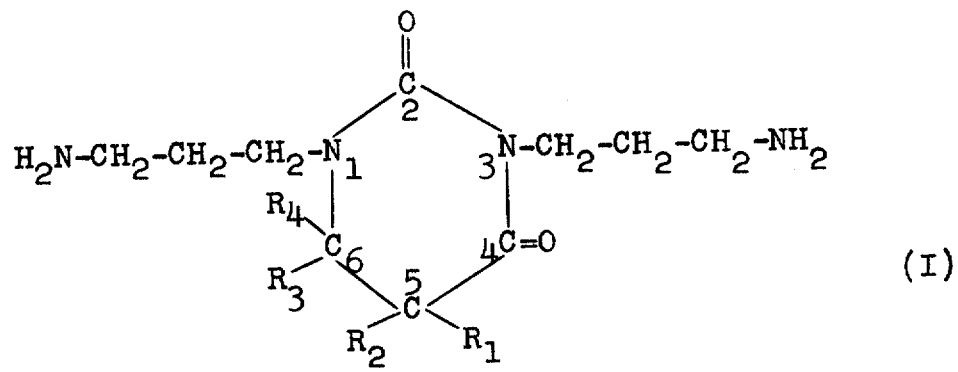

(I)

Signed and sealed this 18th day of July 1972.

(SEAL)
Attest:

EDWARD M. FLETCHER, JR.
Attesting Officer

ROBERT GOTTSCHALK
Commissioner of Patents